United States Patent
Yarger et al.

(10) Patent No.: US 7,697,445 B2
(45) Date of Patent: Apr. 13, 2010

(54) AUTONOMOUS DATA PATH VERIFICATION IN MULTI-MODULE SHELF CONFIGURATION

(75) Inventors: Brian L. Yarger, Rockford, MI (US); Satish K. Jena, Naperville, IL (US); Terrence J. Tanis, Chicago, IL (US); Robert Torstensson, Rolling Meadows, IL (US)

(73) Assignee: Tellabs Operations, Inc., Naperville, IL (US)

( * ) Notice: Subject to any disclaimer, the term of this patent is extended or adjusted under 35 U.S.C. 154(b) by 1480 days.

(21) Appl. No.: 10/455,049

(22) Filed: Jun. 5, 2003

(65) Prior Publication Data

US 2004/0246954 A1 Dec. 9, 2004

(51) Int. Cl.
H04J 1/16 (2006.01)
H04J 3/14 (2006.01)
(52) U.S. Cl. ..................... 370/248; 370/351
(58) Field of Classification Search ................. 370/248, 370/371
See application file for complete search history.

(56) References Cited

U.S. PATENT DOCUMENTS

| | | | |
|---|---|---|---|
| 5,265,096 A | | 11/1993 | Parruck |
| 5,434,858 A | * | 7/1995 | Shimada ..................... 370/373 |
| 5,872,780 A | | 2/1999 | Demiray |
| 6,061,328 A | | 5/2000 | Read |
| 6,363,078 B1 | * | 3/2002 | Garcia et al. ................. 370/438 |
| 6,859,453 B1 | * | 2/2005 | Pick et al. .................... 370/358 |
| 7,177,328 B2 | * | 2/2007 | Miller ......................... 370/503 |
| 2002/0141455 A1 | * | 10/2002 | Akaike et al. ............... 370/535 |
| 2003/0048748 A1 | | 3/2003 | Semaan |

* cited by examiner

Primary Examiner—Gregory B Sefcheck
Assistant Examiner—Suk Jin Kang
(74) Attorney, Agent, or Firm—Hamilton, Brook, Smith & Reynolds, P.C.

(57) ABSTRACT

A system and method for autonomous data path verification in a multi-module shelf configuration, such as in a digital cross-connect system, are disclosed. The system generally includes a source port module, a destination module, and optional n-stage network of mapping interface modules. The source port module is configured to reuse transport overhead bytes of received SONET or SDH signals by inserting data path verification data therefor. The destination module is configured to perform autonomous data path verification between the source port module and the destination module by examining the reused transport overhead bytes of the signals received from the source port module. The method generally includes reusing transport overhead bytes by inserting data path verification data into the overhead bytes of signals received by a first module, e.g., a source port module, and transmitting the signals with the data path verification data toward a second module, e.g., a destination port module. The second module emits a confirmed or unconfirmed pattern upon detecting presence or absence of an expected pattern in the reused transport overhead bytes, respectively, and reports changes in the received pattern to facilitate autonomous data path verification.

21 Claims, 6 Drawing Sheets

Standard SONET STS-12 TOH 200

| 1 | | | | | | | | | | | | 13 | | | | | | | | | | | | 25 | | | | | | | | | | | | |
|---|---|---|---|---|---|---|---|---|---|---|---|---|---|---|---|---|---|---|---|---|---|---|---|---|---|---|---|---|---|---|---|---|---|---|---|
| A1 | A1 | A1 | A1 | A1 | A1 | A1 | A1 | A1 | A1 | A1 | A1 | A2 | A2 | A2 | A2 | A2 | A2 | A2 | A2 | A2 | A2 | A2 | A2 | J0 | Z0 | Z0 | Z0 | Z0 | Z0 | Z0 | Z0 | Z0 | Z0 | Z0 | Z0 |
| B1 | | | | | | | | | | | | E1 | | | | | | | | | | | | F1 | | | | | | | | | | | |
| D1 | | | | | | | | | | | | D2 | | | | | | | | | | | | D3 | | | | | | | | | | | |
| H1 | H1 | H1 | H1 | H1 | H1 | H1 | H1 | H1 | H1 | H1 | H1 | H2 | H2 | H2 | H2 | H2 | H2 | H2 | H2 | H2 | H2 | H2 | H2 | H3 | H3 | H3 | H3 | H3 | H3 | H3 | H3 | H3 | H3 | H3 | H3 |
| B2 | B2 | B2 | B2 | B2 | B2 | B2 | B2 | B2 | B2 | B2 | B2 | K1 | | | | | | | | | | | | K2 | | | | | | | | | | | |
| D4 | | | | | | | | | | | | D5 | | | | | | | | | | | | D6 | | | | | | | | | | | |
| D7 | | | | | | | | | | | | D8 | | | | | | | | | | | | D9 | | | | | | | | | | | |
| D10 | | | | | | | | | | | | D11 | | | | | | | | | | | | D12 | | | | | | | | | | | |
| S1 | Z1 | Z1 | Z1 | Z1 | Z1 | Z1 | Z1 | Z1 | Z1 | Z1 | Z1 | Z2 | Z2 | M1 | Z2 | Z2 | Z2 | Z2 | Z2 | Z2 | Z2 | Z2 | Z2 | E2 | | | | | | | | | | | |

FIG. 2

High-Density Shelf STS-12 Backplane InterfaceTOH 210

| 1 | | | | | | | | | | | | 13 | | | | | | | | | | | | 25 | | | | | | | | | | | | |
|---|---|---|---|---|---|---|---|---|---|---|---|---|---|---|---|---|---|---|---|---|---|---|---|---|---|---|---|---|---|---|---|---|---|---|---|
| A1 | A1 | A1 | A1 | A1 | A1 | A1 | A1 | A1 | A1 | A1 | A1 | A2 | A2 | A2 | A2 | A2 | A2 | A2 | A2 | A2 | A2 | A2 | A2 | | | | | | | | | | | | |
| B1 | | | | | | | | | | | | E1 | E1 | E1 | E1 | E1 | E1 | E1 | E1 | E1 | E1 | E1 | E1 | | | | | | | | | | | | |
| | | | | | | | | | | | | | | | | | | | | | | | | | | | | | | | | | | | |
| H1 | H1 | H1 | H1 | H1 | H1 | H1 | H1 | H1 | H1 | H1 | H1 | H2 | H2 | H2 | H2 | H2 | H2 | H2 | H2 | H2 | H2 | H2 | H2 | H3 | H3 | H3 | H3 | H3 | H3 | H3 | H3 | H3 | H3 | H3 | H3 |
| | | | | | | | | | | | | | | | | | | | | | | | | K2 | | | | | | | | | | | |
| | | | | | | | | | | | | | | | | | | | | | | | | | | | | | | | | | | | |
| | | | | | | | | | | | | | | | | | | | | | | | | | | | | | | | | | | | |
| | | | | | | | | | | | | | | | | | | | | | | | | | | | | | | | | | | | |
| S1 | Z1 | Z1 | Z1 | Z1 | Z1 | Z1 | Z1 | Z1 | Z1 | Z1 | Z1 | Z2 | Z2 | M1 | Z2 | Z2 | Z2 | Z2 | Z2 | Z2 | Z2 | Z2 | Z2 | E2 | E2 | E2 | E2 | E2 | E2 | E2 | E2 | E2 | E2 | E2 | E2 |

FIG. 3

AUTONOMOUS DATA PATH VERIFICATION IN MULTI-MODULE SHELF CONFIGURATION

BACKGROUND OF THE INVENTION

1. Field of the Invention

The present invention relates generally to high speed digital telecommunication systems. More specifically, a system and method for autonomous data path verification in a multi-module shelf configuration, such as in a digital cross-connect system, are disclosed.

2. Description of Related Art

Diagnosing and verifying data path connectivity in network transport and switching systems that involve multiple modules in the data path is increasingly more difficult and expensive due in part to their increasing complexity and flexibility. Conventional diagnostic and verification methods involve generating a signal and measuring its existence on every module independently. The reliance on every module to monitor its output greatly burdens each module and significantly restricts the traffic processing density of every module and thus the system. In addition, providing signal generation and detection circuitry on every data path on every module also increases costs significantly.

Thus, what is needed is a system and method to efficiently and effectively diagnose and verify data path connectivity in network transport and switching systems. Ideally, the system and method can provide always-on module diagnostics.

SUMMARY OF THE INVENTION

A system and method for autonomous data path verification in a multi-module shelf configuration, such as in a digital cross-connect system, are disclosed. It should be appreciated that the present invention can be implemented in numerous ways, including as a process, an apparatus, a system, a device, a method, or a computer readable medium such as a computer readable storage medium or a computer network wherein program instructions are sent over optical or electronic communication lines. Several inventive embodiments of the present invention are described below.

The system generally includes a source port module, a destination module, and optional n-stage network of mapping interface modules. The source port module is configured to reuse transport overhead bytes of received SONET or SDH signals by inserting data path verification data therefor. The destination module is configured to perform autonomous data path verification between the source port module and the destination module by examining the reused transport overhead bytes of the signals received from the source port module.

The method generally includes reusing transport overhead bytes by inserting data path verification data into at least a portion of the transport overhead bytes of signals received by a first module, e.g., a source port module, of a digital cross-connect system and transmitting the signals with the data path verification data toward a second module, e.g., a destination port module. The second module emits a confirmed or unconfirmed pattern upon detecting presence or absence of an expected pattern in the reused transport overhead bytes, respectively, and reports changes in the received pattern to facilitate autonomous data path verification.

Alternatively, the method for autonomous data path verification in a digital cross-connect system may include stripping and reusing at least a portion of transport overhead bytes from SONET or SDH signals received by a first module for data path verification, the reused transport overhead bytes including a parity bit, transmitting signals from the first module to the second module via at least one of a plurality of channels, performing a parity check on the reused transport overhead bytes received by the destination module to detect data corruption indicating failure in the data path by the second module, and upon detecting data corruption by the second module, autonomously switching to another of the channels.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 2 illustrates the standard SONET STS-12 transport overhead (TOH) structure;

FIG. 3 illustrates an example of a high-density shelf STS-12 backplane interface transport overhead (TOH) structure;

DESCRIPTION OF SPECIFIC EMBODIMENTS

A system and method for autonomous data path verification in a multi-module shelf configuration, such as in a digital cross-connect system, are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

Figure 1:
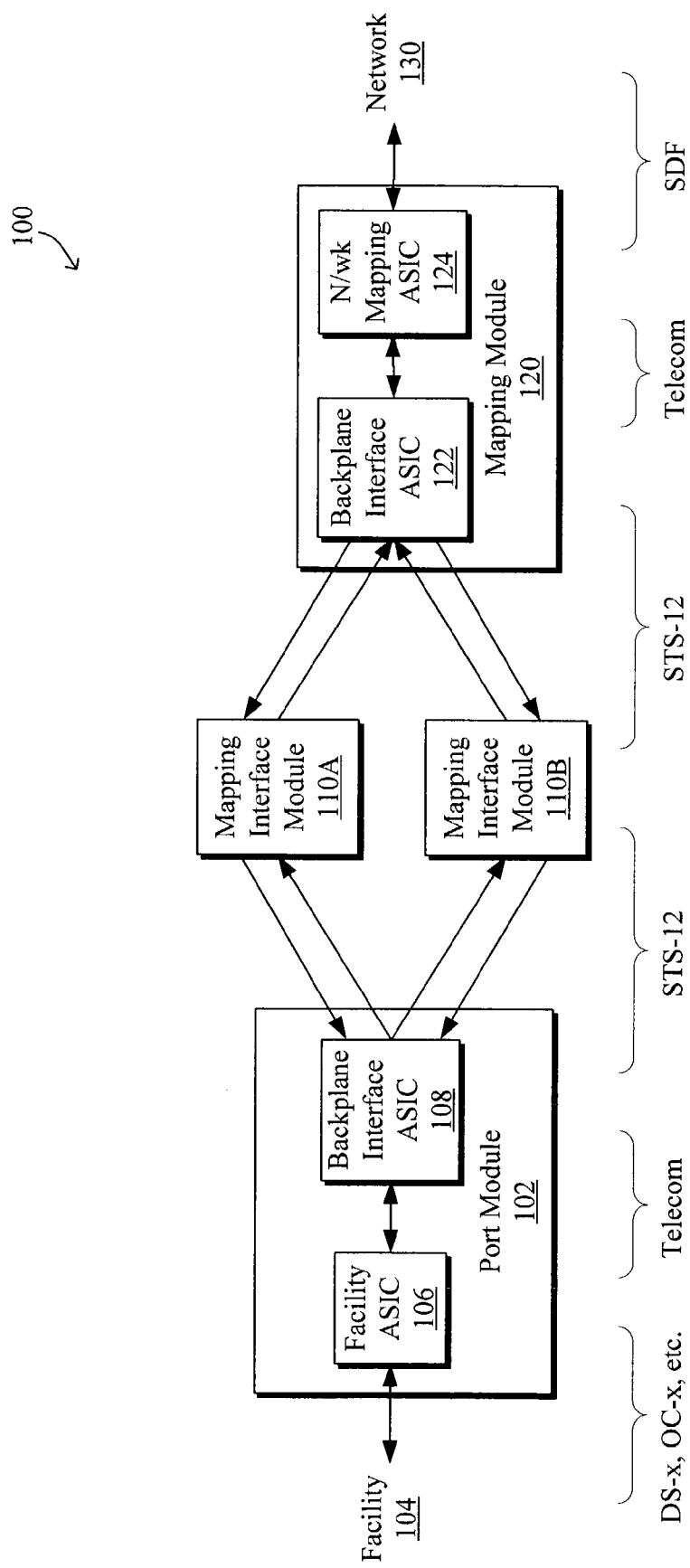
FIG. 1 is a simplified block diagram illustrating the multi-module data path architecture in a universal port shelf for a digital cross connect system according to one preferred embodiment.

FIG. 1 is a simplified block diagram illustrating the multi-module data path architecture 100 in a universal port shelf for a digital cross connect system according to one preferred embodiment. As shown, the multi-module data path architecture 100 includes a port module 102, mapping interface modules 110A, 110B, and a mapping module 120. The port module 102 includes a facility ASIC 106 for receiving data from and transmitting data to customer facility interfaces 104. The port module 102 also includes a backplane interface ASIC 108 for communicating with the facility ASIC 106 and the mapping interface modules 110A, 110B.

The mapping interface modules 110A, 110B are cross-connect switches on a STS-1 or STS-12 level between the backplane interface ASIC 108 of the port module 102 and a backplane interface ASIC 122 of the mapping module 120. Two mapping interface modules 110A, 110B are provided for redundancy and continuity. With the provision of two mapping interface modules 110, two telecom channels are provided. To reduce backplane pin count, the mapping interface modules 110A, 110B may pass parallel telecom data as a serial STS-12 signal with the backplane interface ASICs 108, 122.

Although STS-12 signaling is used as an example herein, it is to be understood that the data path verification in multi-module shelf configuration of the present invention is not limited to the use of STS-12 signaling. Using STS-12 as the transport signaling structure between the individual modules is merely one example and the system and method can be extended to any suitable structure such as those similar to or a direct multiple/scaling of an STS-1 in structure, i.e., STS-n, of which an STS-12 is one such structure, including various SONET and SDH type transport structures such as STS-1, STS-3, STS-12, STS-48, etc., and SDH equivalents.

The mapping module 120 also includes a network mapping ASIC 124 for receiving data from and transmitting data to a switch network 130. Each of the backplane interface ASICs 108, 122 is an interface that converts data from one frame structure to another. For example, the backplane interface ASIC 108 of the port module 102 converts STS-12 data received from the mapping interface modules 110A, 110B to parallel telecom data that the ASIC 106 can process, and vice versa. Similarly, the backplane interface ASIC 122 of the mapping module 120 converts STS-12 data received from the mapping interface modules 110A, 110B to parallel telecom data that the network mapping ASIC 124 can process, and vice versa. In addition, each backplane interface ASIC 108, 122 also handles the redundancy between the mapping interface modules 110A, 110B by generating and examining verification bytes, as will be described in more detail below.

The multi-module data path architecture 100 shown in FIG. 1 is merely one example of a relatively simple architecture. In the simplest case, the architecture may be reduced to two interconnected modules: a source and a destination module, such as two port modules or a port module and a mapping module. Alternatively, the architecture need not include any mapping interface modules, may include multiple mapping interface modules, or may include other modules between the source and destination modules for other applications. Any number of additional modules between the source and destination modules may be present in the datapath, provided that end-to-end transparency (i.e. continuity or connectivity) of the TOH bytes is assured.

Certain bytes of the SONET overhead are reused for other purposes in order to achieve data path verification in multi-module shelf configuration. FIG. 2 illustrates the standard SONET STS-12 transport overhead (TOH) structure 200 and FIG. 3 illustrates an example of a high-density shelf STS-12 backplane interface transport overhead (TOH) structure 210. Note that empty blocks in FIGS. 2 and 3 represent unused/ undefined TOH bytes. As is evident, mapping of the overhead for the high-density shelf STS-12 backplane 210 is similar, though not identical to the mapping of the standard SONET STS-12. It is noted that although some byte references are used in both the standard SONET and the high-density shelf TOH structure 200, 210, e.g., E1, E2, M1, S1, Z1, Z2, etc., those bytes may not be similarly defined in each case. In SONET, some bytes are used to indicate system-to-system information. However, in the STS-12 frame format, those bytes carrying system-to-system information are not needed internal to the multi-module system as they are terminated (extracted) at the ingress port for processing, and are inserted at the egress port for transmission to customer facilities. Thus, certain bytes of the transport overhead entering the multi-module system may be extracted and reused for other purposes. Reusing such overhead bytes internally to pass desired data between the modules within the system 100 enables various signaling and functionality. The added overhead may be taken off when the outbound signal reaches the facility ASIC 106 of the port module 102 prior to the signal being transmitted to the customer facility interfaces 104.

In the case of the high-density shelf TOH structure as shown in FIG. 3, certain overhead bytes may be used (or reused) to provide autonomous-type verification, i.e., without user intervention, for verification of real time continuity (connectivity) between system elements, i.e., the modules, and/or to utilize the information to make decisions on switching, e.g., to a secondary telecom channel. Any suitable overhead bytes may be selected for real-time connectivity verification. In STS-12, STS-1 traceability is provided so that each individual STS-1 contained within STS-12 is uniquely traceable. In other words, for each of the interleaved 12 STS-1 contained in the STS-12, at least one byte is allocated for the tracing such that at least 12 bytes are used to provide traceability of the entire STS-12. Thus, any set of 12 unused bytes that are available may be used. Merely to illustrate, as shown in FIG. 3, any set of 12 unused bytes in columns 1-12 and columns 13-24 in rows 3, 5, 6, 7 and 8 as well as columns 25-36 in rows 1, 2, 3, 6, 7, and 8 may be selected to provide data path verification. In addition, the bytes labeled S1/Z1 and M1/Z2 in columns 1-36 in row 9 are not needed within the system so that the SONET overhead data contained therein may be stripped and the S1/Z1 and M1/Z2 bytes may be reused internal to the multi-module system.

In the illustrative implementation shown in FIG. 1, two bytes are used for each STS-1 to provide STS-1 traceability. Thus, by way of example, the 24 bytes labeled S1/Z1 and M1/Z2 (FIG. 3, row 9, columns 1-24) are selected and reused for data path verification purposes internal to the multi-module system. In the examples described herein, the SONET overhead being extracted and reused internal to the multi-module system are the S1/Z1 and M1/Z2 bytes.

In addition to supporting internal system functions such as data path verification by reusing certain overhead bytes for non-SONET specified purposes, the transport overhead also supports internal system functions. In particular, the overhead also serves some of the traditional SONET transport overhead functions such as frame synchronization (via the A1/A2 bytes), section overhead BIP-8 (via the B1 bytes), STS-level pointer functions (via the H1, H2 and H3 bytes) and line AIS indication (via the K2 byte).

The method of reusing certain SONET overhead bytes will now be described. Referring again to FIG. 1, the facility ASIC 106 in the port module 102 strips data in the SONET overhead bytes being reused off of the incoming line, i.e., from the customer facility interfaces 104. The facility ASIC 106 also inserts SONET overhead data back into the reused SONET overhead bytes on the outgoing line, i.e., to the customer facility interfaces 104. In other words, data received from and transmitted to the customer facility interfaces 104 will be the standard SONET STS-12. The network mapping ASIC 124 performs a corresponding function of stripping the inserted data from the reused SONET overhead bytes off of the line going toward the switch network 130. The network mapping ASIC 124 of the mapping module 120 then converts the SONET data received from the backplane interface ASIC 122 to data in a format internal to the switch network.

Modules Communicate Presence and Await Expected Response

One implementation is to reuse certain SONET overhead bytes within related and associated modules in a segment of the data path such as the data path shown in FIG. 1 to allow the modules to communicate their presence and wait for the expected response during module diagnostics and/or during normal operation. Any disruption in the data path verification transmission mechanism would generally indicate module failure, removal or misconfiguration. The mechanism allows for an always on detection of data path disruption which in turn results into a faster fault indication and thus faster fault recoveries. The multiple modules involved in the transmission data path can provide indication of disruption or restoration of data path without direct human intervention using such a pattern generation/detection and response generation/detection scheme. The use of available overhead bytes within SONET and SDH framework internal to a digital cross-connect system can positively communicate and acknowledge appropriate equipment within the transport/switching systems.

Figure 4:
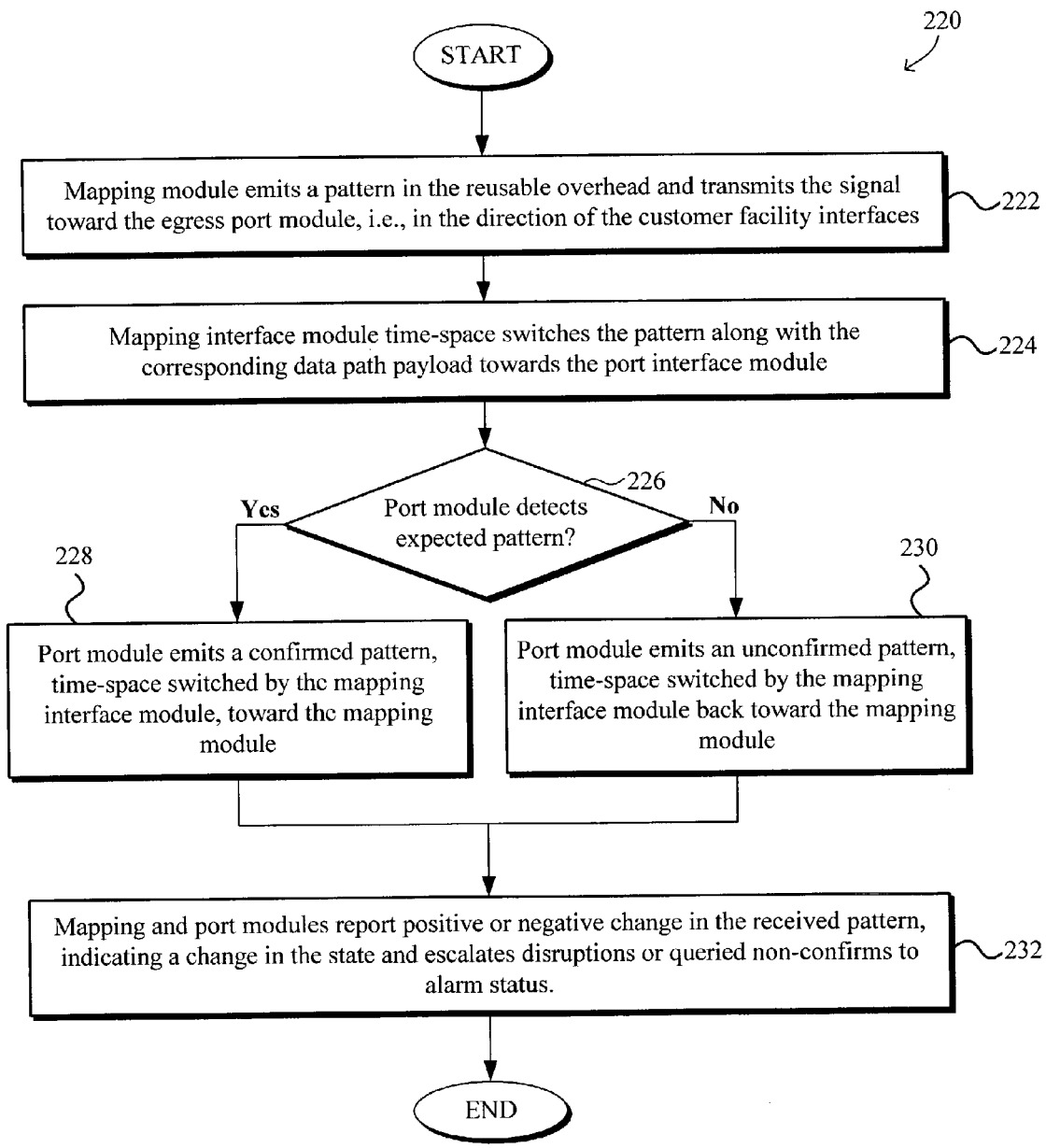
FIG. 4 is a flowchart illustrating a process to detect data path disruption by having modules communicate their presence and awaiting an expected response.

FIG. 4 is a flowchart illustrating a process 220 to detect data path disruption by having the modules communicate their presence and awaiting an expected response. At step 222, the mapping module emits a pattern in the reusable overhead and transmits the signal toward the egress port module, i.e., in the direction of the customer facility interfaces. At step 224, the pattern within each pseudo-SONET STS overhead, i.e., SONET overhead with certain bytes reused for internal functions, along with the corresponding data path payload, in time-space switched by the mapping interface module towards the port interface module.

At decision 226, the port module at the end of the data path expects this pattern to be present and determines whether the expected pattern is present.

If the pattern is detected by the port module, the port module emits a confirmed pattern toward the mapping module, also time-space switched by the mapping interface module, at step 228. Alternatively, if the pattern is not detected by the port module, the port module emits an unconfirmed pattern back toward the mapping module, also time-space switched by the mapping interface module, at step 230. At step 232, The mapping module and the port module can either report a positive or negative change in the receiving pattern, indicating a change in the state. Disruptions or queried non-confirms can then be escalated to alarm status.

Additionally, the mapping interface modules (or other modules between the port module and the mapping module in the data path) may be enhanced to detect patterns emitted by the mapping module and the port module. Control queries of the mapping interface modules can also be used to further isolate proper pattern presence or lack thereof to an individual suspect module. Each port module can emit a specific pattern so the mapping module can detect that the appropriate and expected port module is present. This ability facilitates in identifying misconfigurations and misprovisioned modules without user intervention. Although the flowchart of FIG. 4 illustrates only a detect data path disruption process initiated by the mapping module, additional diagnostics and troubleshooting may be provided by having both the mapping and the port modules emit a pattern in the STS12 overhead towards each other. In particular, once received on the other end by the receiving module, the receiving module alters the pattern and transmits the altered pattern as a confirmation back to the transmitting module. Such dual emission facilitates in detecting disruptions in the data paths. For example, if the transmit path from the mapping module to the port module were disrupted, the mapping module would either see no pattern from the port module, i.e., both paths are broken, or the initial port module pattern, i.e., only the path from the mapping module to the port module is broken. Similarly, if the port module is emitting the initial pattern towards the mapping module then the port module can detect if the mapping module path to/from the port module has full continuity.

Parity Generation and Parity Check

Another implementation of the data path verification overhead bytes is the parity generating and parity check. The backplane interface ASICs in the port and the mapping modules may use the S1/Z1 and M1/Z2 SONET overhead bytes for data path verification to generate and perform parity checks. Thus, if one module in the data path fails, data contained in the overhead verification bytes that are being reused would be corrupted. The backplane interface ASIC would recognize the corruption and autonomously switch to the other mapping interface module to carry data without user intervention.

Figure 5:
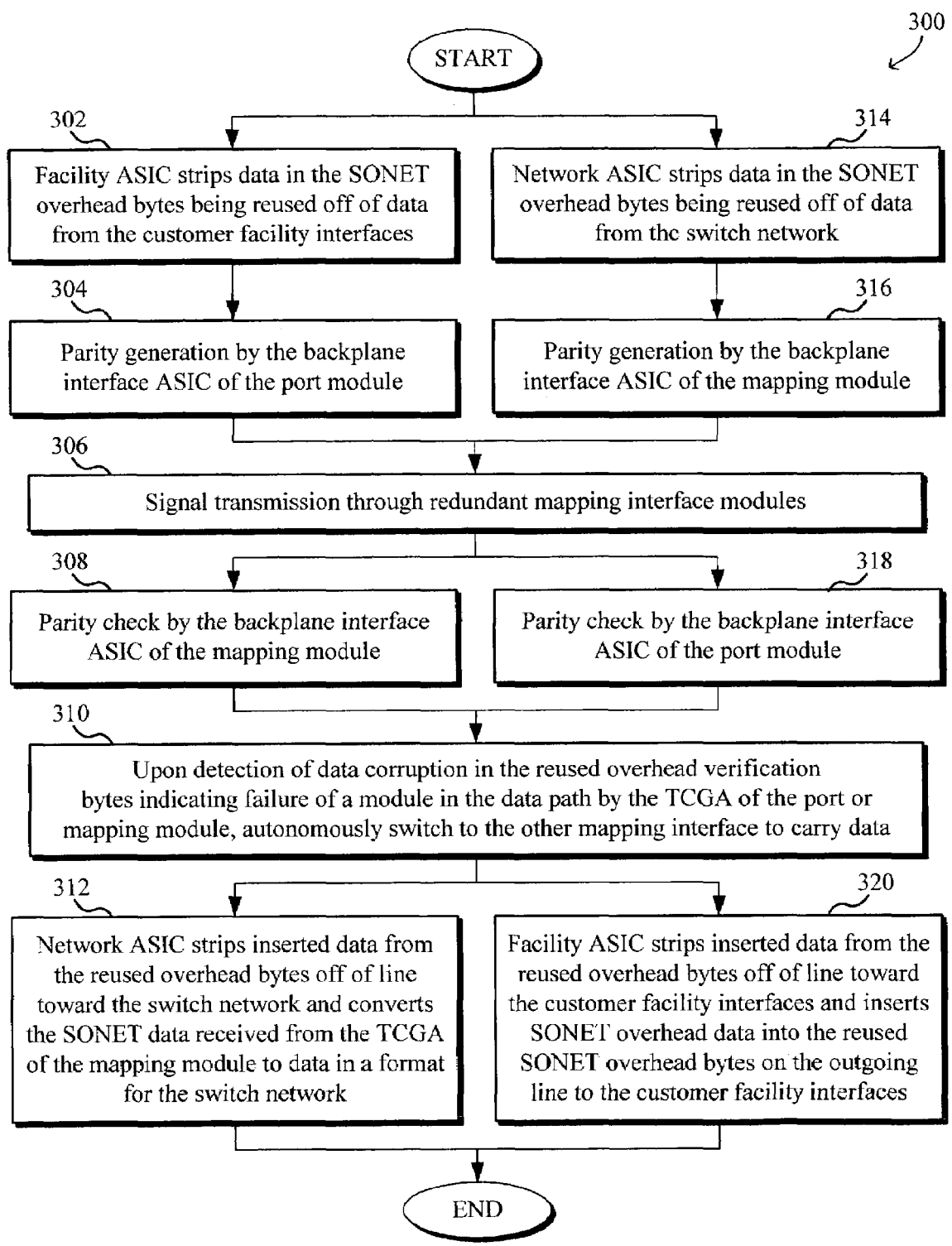
FIG. 5 is a flowchart illustrating a process for data path verification using parity checks.

FIG. 5 is a flowchart illustrating a process 300 for data path verification using parity checks. The process involves reusing the M1/Z2 and S1/Z1 overhead bytes of each SONET STS-12 link between modules to carry a unique code word for each STS-1 contained in the STS-12 in order to verify STS-1 level connectivity of each signal through the multi-module path. The flowchart of FIG. 5 illustrates two data path flows in opposing directions. Namely, the left side of the flowchart illustrate the data path flow from the port (source) module to the mapping (destination) module while the right of the flowchart illustrate the data path flow from the mapping (destination) module to the port (source) module.

For the data path flow from the port (source) module to the mapping (destination) module, the facility ASIC strips data from the SONET overhead bytes being reused, i.e., the S1/Z1 and M1/Z2 bytes, off of data from the customer facility interfaces at step 302. At step 304, the backplane interface ASIC of the port module performs parity generation on the data path verification overhead bytes, i.e., the S1/Z1 and M1/Z2 bytes. At step 306, signals are transmitted through the redundant mapping interface modules toward the mapping module.

At step 308, the backplane interface ASIC of the mapping module performs parity check using the data in the reused SONET S1/Z1 and M1/Z2 overhead bytes. If the result of the parity check indicates data corruption in the reused overhead verification bytes which in turn indicates failure of a module in the data path, the backplane interface ASIC autonomously and automatically switches the data path to the other mapping interface to carry data at step 310. At step 312, the network mapping ASIC strips the inserted data path verification data from the reused overhead bytes off of the line toward the switch network and converts the SONET data received from the backplane interface ASIC of the mapping module to data in a format suitable for the switch network.

For the data path flow from the mapping (destination) module to the port (source) module, the network mapping ASIC strips data from the SONET overhead bytes being reused, i.e., the S1/Z1 and M1/Z2 bytes, off of data from the switch network at step 314. At step 316, the backplane interface ASIC of the mapping module performs parity generation on the data path verification overhead bytes, i.e., the S1/Z1 and M1/Z2 bytes. At step 306, signals are transmitted through the redundant mapping interface modules toward the port module.

At step 318, the backplane interface ASIC of the port module performs parity check using the data in the reused SONET S1/Z1 and M1/Z2 overhead bytes. If the result of the parity check indicates data corruption in the reused overhead verification bytes which in turn indicates failure of a module in the data path, the backplane interface ASIC autonomously and automatically switches the data path to the other mapping interface to carry data at step 310. At step 320, the facility ASIC strips the inserted data path verification data from the reused overhead bytes off of the line toward the customer facility interfaces, and inserts whatever TOH may be appropriate for the customer facility interfaces.

An illustrative definition of the reused SONET S1/Z1 and M1/Z2 overhead bytes and an illustrative parity generation are presented below. However, any other suitable definition for the reused SONET S1/Z1 and M1/Z2 overhead bytes may be used. In addition, any other suitable parity generation schemes may also be implemented.

Definition of STS12 S1/Z2 TOH Bytes

Figure 6:
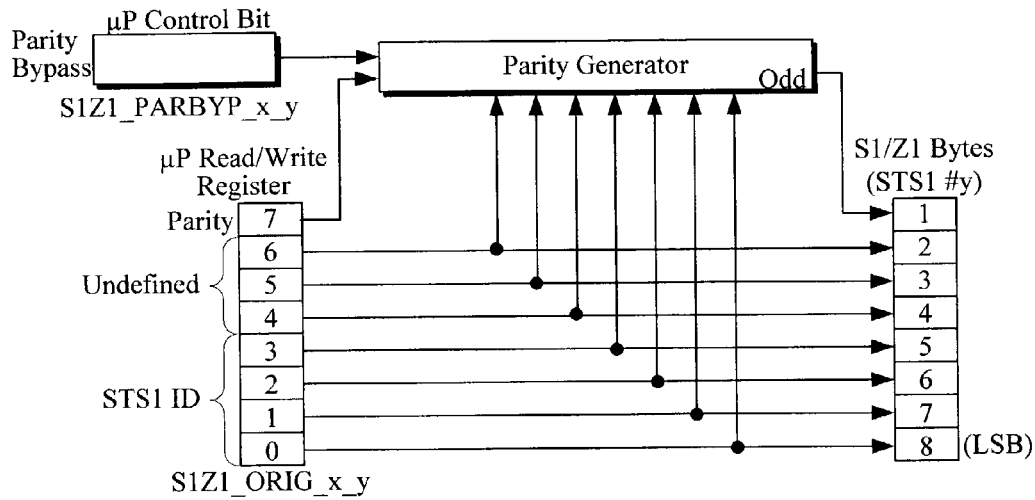
FIG. 6 illustrate an example of suitable bit definitions and parity generation signal flow mechanism for each STS12 S1/Z1 TOH byte on the originating end.
Figure 7:
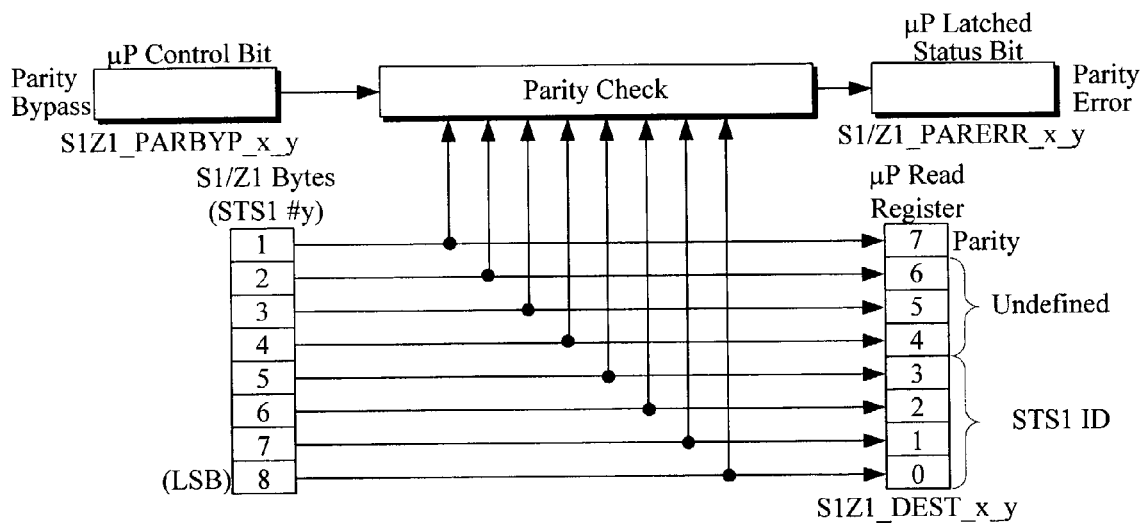
FIG. 7 illustrate an example of suitable bit definitions and parity verification signal flow mechanism for each STS12 S1/Z1 TOH byte on the receiving end.

FIGS. 6 and 7 illustrate an example of suitable bit definitions and parity generation/verification signal flow mechanism for each STS12 S1/Z1 TOH byte on the originating and the receiving ends, respectively. The twelve S1/Z1 bytes for each STS-12 are defined as holding the originating STS1 IDs using any suitable numbering convention where each STS-1 ID is preferably unique in the STS-12, preferably in the four lower order register bits 3, 2, 1, and 0, within the associated STS12. Together with the STS12 ID in the M1/Z2 bytes as discussed below, the two sets of TOH bytes (S1/Z1 and M1/Z2) provide STS traceability through the mapping interface modules from an STS12 level down to STS1 level. The STS1s are numbered in any suitable manner. For example, the STS1s may be numbered 1 through 12 with transmission order, e.g., 1, 4, 7, 10, 2, 5, 8, 11, 3, 6, 9, and 12.

As FIG. 6 illustrates for the source (originating) end, there are 24 read/write registers, designated S1Z1_ORIG_x_y, where x represents the mapping interface module within the data path (A or B) and y represents the STS1 number (1-12). Similarly, as FIG. 7 illustrates for the terminating (destination) end, there are 24 read registers, designated S1Z1_DEST_x_y, where x represents the mapping interface module within the data path (A or B) and y represents the STS1 number (1-12). Register bit 7 is assigned as a parity bit for each S1/Z1 byte. Odd parity is preferably used such that an all-zeros and all-ones value will indicate an error. For example, if one of the redundant mapping interface modules loses power, all data is presumed to go to logic 0 such that odd parity detection will detect the fault. Similarly, when a module is stuck at all 1s, odd parity detection will detect the fault. With the use of odd parity, any unused bits are preferably set to zero (reset state). In addition, undefined register bits, such as register bits 6, 5, and 4, are preferably set to zero due to the use of odd parity.

Definition of STS12 M1/Z2 TOH Bytes

Figure 8:
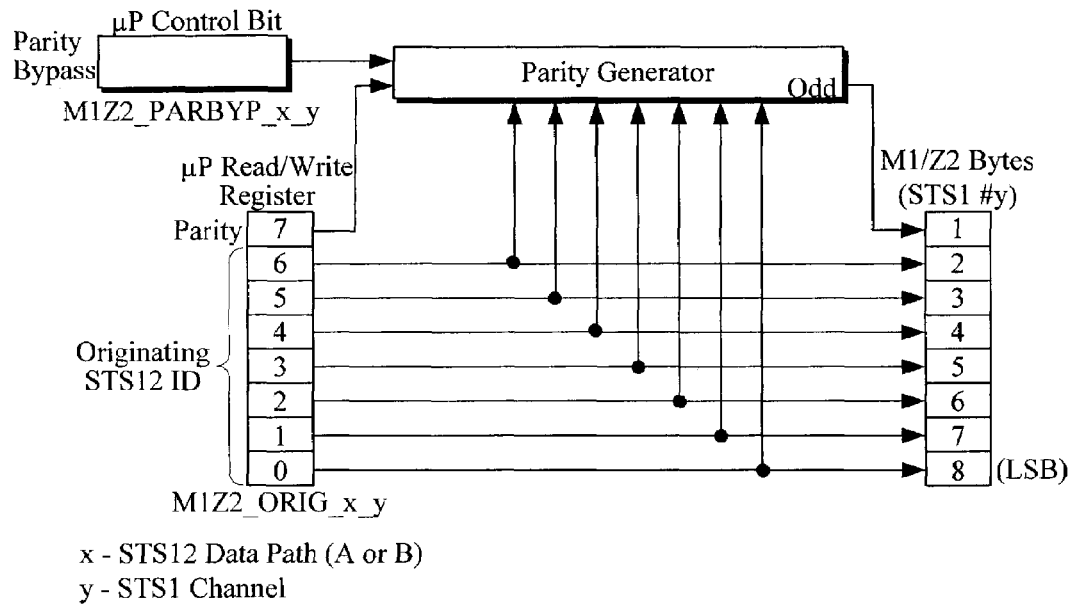
FIG. 8 illustrate an example of suitable bit definitions and parity generation signal flow mechanism for each STS12 M1/Z2 TOH byte on the originating end.
Figure 9:
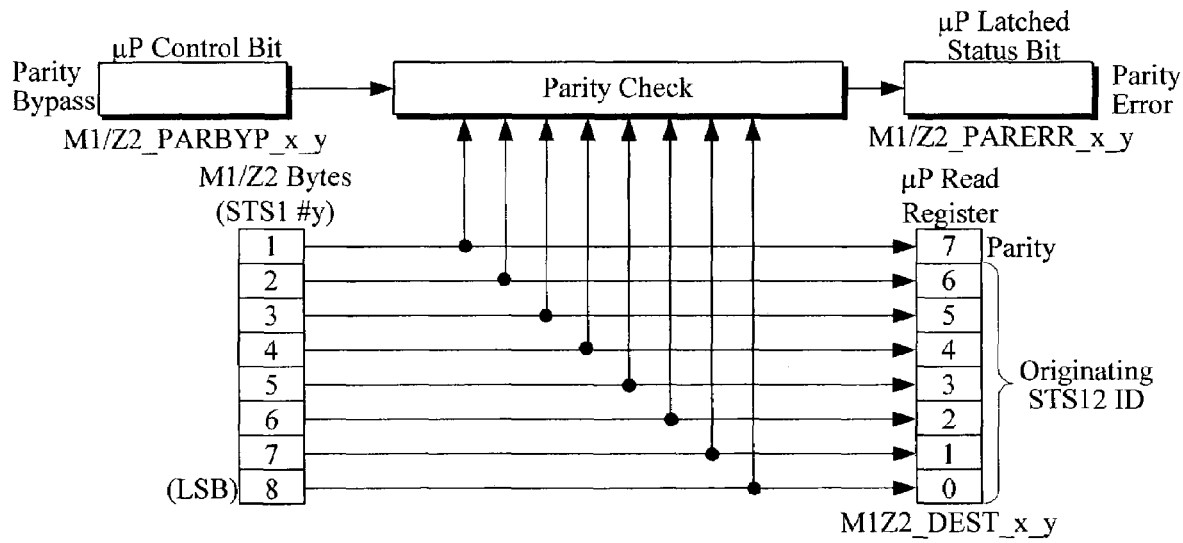
FIG. 9 illustrate an example of suitable bit definitions and parity verification signal flow mechanism for each STS12 M1/Z2 TOH byte on the receiving end.

FIGS. 8 and 9 illustrate an example of suitable bit definitions and parity generation/verification signal flow mechanism for each STS12 M1/Z2 TOH byte on the originating and the receiving ends, respectively. The twelve M1/Z2 bytes for each STS-12 are defined as holding the originating STS12 IDs using any suitable numbering convention. As an example, for one embodiment, register bits 6 (MSB) through 0 may be used for the STS12 IDs, permitting 128 unique STS-12 assignments. In one embodiment, values from decimal 1 through 104 may be used for STS12 IDs, with values from decimals 53 through 104 being designated for future growth. Values from decimal 105 through 126 may be undefined.

As FIG. 8 illustrates for the source (originating) end, there are 24 read/write registers, designated M1Z2_ORIG_x_y, where x represents the mapping interface module within the data path (A or B) and y represents the STS1 number (1-12). Similarly, as FIG. 9 illustrates for the terminating (destination) end, there are 24 read registers, designated M1Z2_DEST_x_y, where x represents the mapping interface module within the data path (A or B) and y represents the STS1 number (1-12). Because of the use of odd parity, any unused bits are preferably set to zero (reset state).

The above described implementations are merely example of many possible implementations. For example, any number of re-usable STS-12 transport and/or path overhead bytes may be used and many other different generation/confirmation schemes may alternatively be employed.

In addition, any suitable combination of hardware- and software-based control may be implemented. For example, the hardware for implementing the data path verification is preferably always on. By having the hardware being always on, the reused data path verification overhead bytes are always available for use, whether or not data path verification is being performed. For real time failure detection, the data path verification overhead bytes would always be checked or checked frequently enough such that the data path verification approximates real-time detection. Even with the data path verification overhead bytes being always available, data path verification software may be implemented as always on or may be implemented to periodically poll the data path verification overhead bytes. However, any other suitable combination of hardware- and/or software-implementation variations may be employed.

While the preferred embodiments of the present invention are described and illustrated herein, it will be appreciated that they are merely illustrative and that modifications can be made to these embodiments without departing from the spirit and scope of the invention. Thus, the invention is intended to be defined only in terms of the following claims.

What is claimed is:

1. A system for autonomous data path verification in a digital data switching system, comprising:

a source port module configured to receive signals from and transmit signals to customer facility interfaces, the signals being selected from SONET and SDH signals and having transport overhead bytes, the source port module being configured to strip and reuse at least a portion of the transport overhead bytes from the received signals by inserting data path verification data therefor;

a destination module configured to communicate with the source port module, the destination module being configured to perform autonomous data path verification between the source port module and the destination module by examining the reused transport overhead bytes of the signals received from the source port module;

a mapping interface module in communication with the source port module and the destination module, the mapping interface module configured to time-space switch the payload and overhead of the signals at a substrate level; and wherein the destination module is further configured to modify the data path verification data and transmit the modified data path verification data to the source port module, and wherein the source port module is further configured to perform autonomous data path verification by examining the modified data path verification data received from the destination module.

2. The system for autonomous data path verification of claim 1, wherein the reused transport overhead bytes include S1/Z1 transport overhead bytes.

3. The system for autonomous data path verification of claim 1, wherein the reused transport overhead bytes include M1/Z2 transport overhead bytes.

4. The system for autonomous data path verification of claim 1, wherein the destination module is selected from a group consisting of a destination port module and a mapping module.

5. The system for autonomous data path verification of claim 1, further comprising an n-stage network of mapping interface modules, the n-stage network of mapping interface modules being in communication with the source port module and the destination module and being configured to time-space switch the payload and overhead of the signals at a substrate level.

6. The system for autonomous data path verification of claim 1, wherein the source port and destination modules are configured to communicate using STS-n signaling within the digital data switching system.

7. The system for autonomous data path verification of claim 1, wherein the destination module is further configured to communicate with a switched network.

8. The system for autonomous data path verification of claim 1, wherein the transport overhead bytes of the signals are in a high-density shelf STS-12 backplane interface transport overhead structure.

9. A method for autonomous data path verification in a digital data switching system, comprising:
generating and inserting data path verification data into at least a portion of transport overhead bytes of signals received by a first module of the digital data switching system, said signals being selected from SONET and SDH signals and said portion of transport overhead bytes being reused for data path verification;
transmitting the signals with the inserted data path verification data toward a second module of the digital data switching system, the first module being selected from a source module and a destination module and the second module being the other of the source and destination modules;
time-space switching, by a mapping interface module in communication with the source and destination modules, the payload and overhead of the signals at a substrate level;
emitting a confirmed pattern by the second module if the second module detects an expected pattern in the reused transport overhead bytes of the signals received from the first module and emitting an unconfirmed pattern if the second module fails to detect the expected pattern;
reporting changes in the received pattern by the second module to facilitate autonomous data path verification; and
modifying the data path verification data by the second module;
transmitting the modified data path verification data to the first module; and
performing autonomous data path verification by the first module based on the modified data path verification data received by the first module.

10. The method for autonomous data path verification of claim 9, further comprising escalating to alarm status by the second module upon failure to detect the expected pattern.

11. The method for autonomous data path verification of claim 9, wherein the first and second modules are configured to generate data path verification data specific to each module.

12. The method for autonomous data path verification of claim 9, wherein said transmitting includes transmitting the signals to the second module via an n-stage network of mapping interface modules.

13. The method for autonomous data path verification of claim 12, wherein each mapping interface module is configured to detect patterns transmitted by the first and the second modules.

14. The method for autonomous data path verification of claim 13, further comprising querying the mapping interface modules to isolate pattern presence or absence to a specific module.

15. The method for autonomous data path verification of claim 13, wherein the expected pattern is the data path verification data, the data path verification data including parity data.

16. A method for autonomous data path verification in a digital data switching system, comprising:
stripping and reusing at least a portion of transport overhead bytes from signals received by a first module for data path verification, the signals being selected from SONET and SDH signals and the reused transport overhead bytes including a parity bit;
transmitting signals from the first module to a second module via at least one of a plurality of channels;
time-space switching, by a mapping interface module in communication with the first and second modules, the payload and overhead of the signals at a substrate level;
performing a parity check on the reused transport overhead bytes received by the second module to detect data corruption indicating failure in the data path by the second module, wherein the parity check is performed on the reused transport overhead bytes by using the parity bit that is included in the reused transport overhead bytes; and
upon detection of data corruption by the second module, autonomously switching to another of said plurality of channels.

17. A method for autonomous data path verification of claim 16, further comprising stripping data from the reused overhead bytes and reformatting data received by the second module for transmission to one of a switched network and customer facility interface.

18. A method for autonomous data path verification of claim 16, wherein the digital data switching system includes an n-stage network of mapping interface modules for providing the plurality of channels between the first and second modules.

19. A method for autonomous data path verification of claim 16, wherein the first module is selected from a source module and a destination module and the second module is the other of the source and destination modules.

20. A method for autonomous data path verification of claim 16, wherein the parity bit is generated by the first module using STS1 ID.

21. A system for autonomous data path verification in a digital data switching system, comprising:

a source port module configured to receive signals from and transmit signals to customer facility interfaces, the signals being selected from SONET and SDH signals and having transport overhead bytes, the source port module being configured to strip and reuse at least a portion of the transport overhead bytes from the received signals by inserting data path verification data therefor;

a destination module configured to communicate with the source port module, the destination module being configured to perform autonomous data path verification between the source port module and the destination module by examining the reused transport overhead bytes of the signals received from the source port module;

a mapping interface module in communication with the source port module and the destination module, the mapping interface module configured to time-space switch the payload and overhead of the signals at a substrate level; and wherein hardware for implementing the system is always on to make the reused transport overhead bytes always available for use, whether or not data path verification is being performed, and further wherein the reused transport overhead bytes are checked frequently enough that data path verification approximates real-time detection.

* * * * *

UNITED STATES PATENT AND TRADEMARK OFFICE
CERTIFICATE OF CORRECTION

| | | |
|---|---|---|
| PATENT NO. | : 7,697,445 B2 | Page 1 of 1 |
| APPLICATION NO. | : 10/455049 | |
| DATED | : April 13, 2010 | |
| INVENTOR(S) | : Brian L. Yarger et al. | |

It is certified that error appears in the above-identified patent and that said Letters Patent is hereby corrected as shown below:

Column 8, claim 1, line 66, delete "substrate" and insert --subrate--.

Column 9, claim 5, line 25, delete "substrate" and insert --subrate--.

Column 9, claim 9, line 54, delete "substrate" and insert --subrate--.

Column 10, claim 16, line 38, delete "substrate" and insert --subrate--.

Column 12, claim 21, line 4, delete "substrate" and insert --subrate--.

Signed and Sealed this

Twenty-second Day of June, 2010

David J. Kappos
*Director of the United States Patent and Trademark Office*